United States Patent
Reynier et al.

(10) Patent No.: US 11,482,724 B2
(45) Date of Patent: Oct. 25, 2022

(54) ELECTROCHEMICAL CELL FOR LITHIUM ACCUMULATOR COMPRISING A SPECIFIC NEGATIVE ELECTRODE MADE OF METALLIC LITHIUM AND A POSITIVE ELECTRODE ON ALUMINIUM COLLECTOR

(71) Applicant: COMMISSARIAT À L'ÉNERGIE ATOMIQUE ET AUX ÉNERGIES ALTERNATIVES, Paris (FR)

(72) Inventors: Yvan Reynier, Grenoble (FR); Céline Barchasz, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 189 days.

(21) Appl. No.: 16/732,866

(22) Filed: Jan. 2, 2020

(65) Prior Publication Data
US 2020/0220201 A1 Jul. 9, 2020

(30) Foreign Application Priority Data
Jan. 3, 2019 (FR) ..................... 1900047

(51) Int. Cl.
*H01M 10/052* (2010.01)
*H01M 4/38* (2006.01)
(Continued)

(52) U.S. Cl.
CPC ......... *H01M 10/052* (2013.01); *H01M 4/382* (2013.01); *H01M 4/483* (2013.01);
(Continued)

(58) Field of Classification Search
CPC .... H01M 10/052; H01M 4/382; H01M 4/483; H01M 4/505; H01M 4/525;
(Continued)

(56) References Cited

U.S. PATENT DOCUMENTS 5,260,144 A * 11/1993 O'Callaghan ....... H01M 12/065
429/513
2008/0118847 A1 5/2008 Jung et al.
(Continued)

FOREIGN PATENT DOCUMENTS

| CN | 107068964 A | 8/2017 |
| WO | 02/41416 A2 | 5/2002 |
| WO | 2017/190135 A1 | 11/2017 |

OTHER PUBLICATIONS

Search Report for French application No. 1900047 dated Sep. 20, 2019.

*Primary Examiner* — Sarah A. Slifka
*Assistant Examiner* — Rachel L Zhang
(74) *Attorney, Agent, or Firm* — Pearne & Gordon LLP (57) ABSTRACT

An electrochemical cell for a lithium accumulator comprising: a negative electrode comprising metallic lithium as active material; a positive electrode associated with an aluminium current collector; and an electrolyte placed between the negative electrode and the positive electrode, wherein the negative electrode is provided with a layer comprising a compound containing aluminium at its face in contact with the electrolyte, and in that the electrolyte comprises at least one lithium salt chosen from among lithium imide, lithium triflate, lithium perchlorate salts and mixtures thereof.

16 Claims, 3 Drawing Sheets (51) Int. Cl.
  *H01M 4/66* (2006.01)
  *H01M 10/0565* (2010.01)
  *H01M 10/0568* (2010.01)
  *H01M 10/0569* (2010.01)
  *H01M 10/42* (2006.01)
  *H01M 4/58* (2010.01)
  *H01M 4/505* (2010.01)
  *H01M 4/525* (2010.01)
  *H01M 4/48* (2010.01)

(52) U.S. Cl.
  CPC ........... *H01M 4/505* (2013.01); *H01M 4/525* (2013.01); *H01M 4/5815* (2013.01); *H01M 4/5825* (2013.01); *H01M 4/661* (2013.01); *H01M 10/0565* (2013.01); *H01M 10/0568* (2013.01); *H01M 10/0569* (2013.01); *H01M 10/42* (2013.01); *H01M 2300/0025* (2013.01); *H01M 2300/0085* (2013.01)

(58) Field of Classification Search
  CPC .. H01M 4/5815; H01M 4/5825; H01M 4/661; H01M 10/0565; H01M 10/568; H01M 10/569; H01M 10/42
  See application file for complete search history.

(56) References Cited

U.S. PATENT DOCUMENTS

| | | |
|---|---|---|
| 2013/0164636 A1 | 6/2013 | Hwang et al. |
| 2013/0323595 A1* | 12/2013 | Sohn ................... H01M 4/1395 429/221 |
| 2014/0227608 A1* | 8/2014 | Tanabe ............. H01M 10/0562 429/322 |
| 2016/0351877 A1* | 12/2016 | Kusachi ................... H01M 4/62 |
| 2017/0200943 A1* | 7/2017 | Kawakami ............ H01G 11/40 |
| 2018/0145314 A1 | 5/2018 | Dumont et al. |
| 2018/0315995 A1 | 11/2018 | Reynier et al. |
| 2018/0316020 A1* | 11/2018 | Pfleging ............. B23K 26/0624 |
| 2018/0375156 A1* | 12/2018 | Zhamu ................. H01M 4/134 |

\* cited by examiner

ELECTROCHEMICAL CELL FOR LITHIUM ACCUMULATOR COMPRISING A SPECIFIC NEGATIVE ELECTRODE MADE OF METALLIC LITHIUM AND A POSITIVE ELECTRODE ON ALUMINIUM COLLECTOR

CROSS-REFERENCE TO RELATED APPLICATIONS

This application claims priority from French Patent Application No. 19 00047 filed on Jan. 3, 2019. The content of this application is incorporated herein by reference in its entirety.

TECHNICAL FIELD

This invention relates to an electrochemical cell for a lithium accumulator comprising an association between a specific negative electrode based on metallic lithium and a positive electrode on an aluminium current collector that in particular can obtain excellent cyclability performances.

The general field of the invention can thus be defined as energy storage devices, particularly lithium electrochemical accumulators.

Energy storage devices are conventionally electrochemical accumulators functioning on the principle of electrochemical cells capable of outputting an electric current due to the presence in each of them of a pair of electrodes (a positive electrode and a negative electrode respectively) separated by an electrolyte, the electrodes comprising specific materials capable of reacting according to an oxidation-reduction reaction, through which electrons are produced generating an electric current and the production of ions that will circulate from one electrode to the other through an electrolyte.

The most frequently used accumulators of this type are:
  Ni-MH accumulators using metal hydride and nickel oxyhydroxide as electrode materials;
  Ni-Cd accumulators using cadmium and nickel oxyhydroxide as electrode materials;
  Acid-Lead accumulators using lead and lead oxide $PbO_2$ as electrode materials; and
  lithium accumulators such as lithium ion accumulators (in which in principle, the positive electrode active material and the negative electrode active material are lithium insertion materials) or lithium-metal accumulators (of which the negative electrode is composed of metallic lithium).

Since lithium is a particularly lightweight solid element and has the lowest electrochemical potential, thus enabling access to an interesting energy density per unit mass, the lithium accumulators mentioned above largely replaced the other accumulators mentioned above and are found to be particularly interesting for fields in which endurance is an essential criterion, as is the case in computer, video, mobile telephony fields, in transport such as electric vehicles, hybrid vehicles, or in the medical, space and microelectronic fields.

Lithium-metal accumulators conventionally comprise at least one electrochemical cell composed of the following elements:
a negative electrode based on metallic lithium;
a positive electrode based on a compound capable of inserting lithium; and
an electrolytic membrane (that can also be called a separator) located between said negative electrode and said positive electrode.

However, although the metallic lithium used to form the negative electrodes can obtain a high nominal cell voltage and excellent energy densities per unit mass and per unit volume, it is nevertheless disadvantageous during accumulator cycling processes. During cycling processes, metallic lithium is alternately dissolved in the electrolyte in the form of ions during discharge, and redeposited on the negative electrode during recharge. At the end of a certain number of cycles, particularly when the electrolytic membrane comprises a liquid electrolyte, lithium dendrites can form that can firstly contribute to denaturing the physical integrity of the membrane and secondly can generate a short circuit phenomenon when the dendrites physically connect the negative electrode to the positive electrode, which can result in particular in a substantial rise in the battery temperature and its irreversible degradation. Furthermore, the metallic lithium can react with a liquid electrolyte to form partially inactive lithium foam, that entrains a loss of active material during cycling thus inducing a limited life of accumulators functioning with metallic lithium at the negative electrode.

To prevent the formation of foam and dendrites, it has been proposed on the market lithium accumulators for which the negative electrode is based on metallic lithium and using a solid electrolyte to create a separation between the negative electrode and the positive electrode, and more specifically a polymer electrolyte comprising polyoxyethylene (known under the abbreviation POE). This electrolyte is less reactive to metallic lithium than liquid or gel electrolytes, and is also used in the form of a thin layer, which requires lower current densities per unit area and thus reduces the risk of the formation of dendrites. However, this technology requires a high operating temperature (particularly more than 50° C.) to compensate for the insufficient conductivity of this solid electrolyte at ambient temperature.

In order to be able to benefit from properties inherent to the use of metallic lithium (particularly in terms of the density per unit mass and per unit volume) while avoiding the disadvantages related to the use of a polymer electrolyte, the authors of this invention fixed themselves the objective of proposing an electrochemical cell for a lithium accumulator using a metallic lithium electrode as the negative electrode, while limiting the phenomenon of formation of lithium foam and dendrites and obtaining good cyclability properties.

Presentation of the Invention

Thus, the invention relates to an electrochemical cell for a lithium accumulator comprising:
  a negative electrode comprising metallic lithium as active material;
  a positive electrode associated with an aluminium current collector; and
  an electrolyte placed between said negative electrode and said positive electrode, characterised in that the negative electrode is provided at its face in contact with the electrolyte with a layer comprising a compound containing aluminium, and in that the electrolyte comprises at least one lithium salt chosen from among lithium imide, lithium triflate, lithium perchlorate salts and mixtures thereof.

The authors of this invention have been able to demonstrate excellent cyclability properties due to the presence of this layer on the surface of the negative electrode, that can be explained particularly by the protective role performed by this layer with regard to the foam formation and dendrites problem.

Before going into the description of this invention in further detail, we will give the following definitions.

In the above and in the following description, negative electrode classically means the electrode that acts as the anode when the battery outputs current (in other words when it is in the discharge process) and that acts as the cathode when the battery is in the charge process.

In the above and in the following description, positive electrode classically means the electrode that acts as the cathode when the battery outputs current (in other words when it is in the discharge process) and that acts as the anode when the battery is in the charge process.

According to the invention, the negative electrode comprises metallic lithium as active material. In particular, it may be composed exclusively of metallic lithium (which in other words means that it does not comprise any ingredients other than metallic lithium). It can also be associated with a current collector and more specifically, a copper current collector.

From a structural point of view, the negative electrode may be in the form of a 5 μm to 500 μm thick lithium plate or lithium sheet.

The positive electrode may preferably comprise an active material chosen from among lithiated phosphates comprising at least one metallic transition element, the lithiated oxides comprising at least one metallic element (for example at least one metallic transition element and/or at least one metallic post-transition element), lithium based metal sulfides, vanadium oxides, disulfides based on at least one metallic transition element, elementary sulfur and mixtures thereof.

Among lithiated phosphates comprising at least one metallic transition element, mention may be made of lithiated phosphates with formula $LiM^1PO_4$, wherein $M^1$ is chosen from among Fe, Mn, Ni, Co and mixtures thereof, such as $LiFePO_4$, $LiMnPO_4$.

Among lithiated oxides comprising at least one metallic element, mention may be made of simple oxides or mixed oxides (in other words oxides containing several distinct metallic transition elements) comprising at least one metallic element, such as oxides containing nickel, cobalt, manganese and/or aluminium (these oxides possibly being mixed oxides).

More specifically, among mixed oxides containing nickel, cobalt, manganese and/or aluminium, mention can be made of compounds with the following formula:

$$Li_{1+x}M^2O_2,$$

wherein $M^2$ is an element chosen from among Ni, Co, Mn, Al and mixtures thereof and x is greater than or equal to 0.

Among examples of such oxides, mention may be made of lithiated oxides $LiCoO_2$, $LiNiO_2$ and mixed oxides Li(Ni, Co,Mn)$O_2$ such as $Li(Ni_{1/3}Mn_{1/3}CO_{1/3})O_2$, $Li(Ni_{0.8}Mn_{0.1}Co_{0.1})O_2$ or $Li(Ni_{0.6}Mn_{0.2}Co_{0.2})O_2$ (also known under the name NMC)), Li(Ni,Co,Al)$O_2$ (such as $Li(N_{0.8}Co_{0.15}Al_{0.05})O_2$ also known under the name NCA) or Li(Ni, Co,Mn,Al)$O_2$, oxides said to be lithium-rich or overlithiated oxides, such as oxides of $Li_{1+x}(Ni,Co,Mn)O_2$, in which x is greater than 0.

Among oxides comprising nickel, cobalt, manganese and/or aluminium, mention may also be made of oxides with a spinel structure such as $LiMn_2O_4$.

Among lithium based metal sulfides, mention may advantageously be made of "rock-salt" type metal sulfides and particularly compounds with formula $Li_2TiS_3$ or $Li_3NbS_4$.

Among vanadium oxides, mention may be made in particular of vanadium oxide $V_2O_5$.

Among disulfides based on at least one metallic transition element, mention may be made in particular of disulfides crystallising in a pyrite type crystalline type structure, such as $FeS_2$, $TiS_2$.

Apart from the presence of an active material, the positive electrode may comprise an organic binder, in particular a polymeric binder such as polyvinylidene fluoride (known under the abbreviation PVDF), a carboxymethylcellulose mixture (known under the abbreviation CMC) with a styrene-butadiene type latex (known under the abbreviation SBR) or with polyacrylic acid (known under the abbreviation PAA) and one or several electricity conducting additives that can be carbon materials such as carbon black.

Also from a structural point of view, the positive electrode may be in the form of a composite material comprising a matrix of polymeric binder(s) such as PVDF (for example with a content of 1 to 10% by mass relative to the total mass of the electrode) within which fillers composed of the active material are dispersed (for example with a content of 80 to 98% by mass relative to the total mass of the electrode) and possibly the electricity conducting additive(s) such as carbon black (for example with a content of 1 to 8% by mass relative to the total mass of the electrode), said composite material being deposited on an aluminium current collector.

The cells according to this invention also comprise an electrolyte located between the positive electrode and the negative electrode, the surface of the negative electrode in contact with the electrolyte being provided with a layer comprising a compound comprising aluminium and the electrolyte comprising at least one lithium salt chosen from among lithium imide, lithium triflate, lithium perchlorate salts and mixtures thereof.

More specifically, the electrolyte may be a liquid electrolyte which, apart from the above-mentioned lithium salt(s), may comprise one or several organic solvents, the organic solvents possibly being:

solvents in the carbonate solvents family such as cyclic carbonate solvents, linear carbonate solvents and mixtures thereof;

solvents in the ethers family, such as 1,3-dioxolane, tetraethyleneglycoldimethylether, 1,2-dimethoxyethane; and mixtures thereof.

The electrolyte may also be a gel electrolyte, for example a liquid electrolyte like that explained above, impregnating a polymer matrix (for example an polyethylene oxide matrix (also designated by the abbreviation PEO), a polyacrylonitrile matrix (also designated by the abbreviation PAN), a polymethyl methacrylate (also designated by the abbreviation PMMA) or a polyvinylidene fluoride (also designated by the abbreviation PVDF), that gelifies in contact with this liquid adhesive.

As examples of cyclic carbonate solvents, mention may be made of ethylene carbonate (symbolised by the abbreviation EC), or propylene carbonate (symbolised by the abbreviation PC).

As examples of linear carbonate solvents, mention may be made of dimethyl carbonate (symbolised by the abbreviation DMC), diethyl carbonate (symbolised by the abbreviation DEC), or ethylmethyl carbonate (symbolised by the abbreviation EMC).

In particular, the liquid electrolyte may comprise a mixture of carbonate solvents, for example an EC/DMC mixture, for example in equal quantities.

When the lithium salts are lithium imide salts, they can be chosen in particular from among lithium imide salts such as lithium bis(trifluoromethane)sulfonylimide with formula $Li[N(SO_2CF_3)_2]$ (known under the abbreviation LiTFSI), lithium bis(fluorosulfonyl)imide with formula Li[N(SO$_2$F)$_2$] (known under the abbreviation LiFSI) and lithium bis(pentafluoroethane)sulfonylimide with formula Li[N(SO$_2$CF$_2$CF$_3$)$_2$] (known under the abbreviation LiBETI).

Furthermore, when the electrolyte is a liquid electrolyte, in other words it is not a gel, it may imbibe a separating element, for example a porous polymeric separating element placed between two electrodes of the accumulator, it being understood that the polymer(s) forming the separator do not gel, unlike the case with gelled electrodes.

In particular, advantageous electrochemical cells conforming with the invention include the following positive electrode lithium salt/active electrode combinations:

when the lithium salt is LiTFSI, the positive electrode advantageously comprises, as active material, a lithiated phosphate comprising at least one metallic transition element such as LiFePO$_4$ and/or a disulfide based on at least one metallic transition element such as TiS$_2$ or FeS$_2$ and/or a vanadium oxide such as V$_2$O$_5$ and/or a metal sulfide based on lithium of the "rock-salt" type such as Li$_2$TiS$_3$ or Li$_3$NbS$_4$;

when the lithium salt is lithium perchlorate, the positive electrode advantageously comprises elementary sulfur as the active material;

when the lithium salt is LiFSI, the positive electrode advantageously comprises, as active material, a lithiated phosphate comprising at least one metallic transition element such as LiFePO$_4$ and/or a disulfide based on at least one metallic transition element such as TiS$_2$ or FeS$_2$ and/or a vanadium oxide such as V$_2$O$_5$ and/or a metal sulfide based on lithium of the "rock-salt" type such as Li$_2$TiS$_3$ or Li$_3$NbS$_4$ and/or a lithiated oxide comprising at least one metallic element such as Li(Mn,Ni,Co)O$_2$;

when the lithium salt is lithium triflate, the positive electrode advantageously comprises, as an active material, elementary sulfur and/or a disulfide based on at least one metallic transition element such as TiS$_2$ or FeS$_2$ and/or a metal sulfide based on lithium of the "rock-salt" type, such as Li$_2$TiS$_3$ or Li$_3$NbS$_4$;

when the lithium salt is LiBETI, the positive electrode advantageously comprises, as an active material, a lithiated phosphate comprising at least one metallic transition element, such as LiFePO$_4$ or LiMnPO$_4$ and/or elementary sulfur and/or a disulfide based on at least one metallic transition element, such as TiS$_2$ or FeS$_2$ and/or a vanadium oxide, such as V$_2$O$_5$ and/or a metal sulfide based on lithium of the "rock-salt" type, such as Li$_2$TiS$_3$ or Li$_3$NbS$_4$ and/or a lithiated oxide comprising at least one metallic element such as LiCoO$_2$, Li(Mn,Ni,Co)O$_2$ (such as LiNi$_{0.6}$Mn$_{0.2}$Co$_{0.2}$O$_2$, LiNi$_{0.8}$Mn$_{0.1}$Co$_{0.1}$O$_2$), Li(Ni,Co,Al)O$_2$ (such as LiNi$_{0.8}$Co$_{0.15}$Al$_{0.05}$O$_2$), LiMn$_2$O$_4$ or an overlithiated oxide comprising manganese, nickel and possibly cobalt such as oxides of formula Li$_{1+x}$(Mn,Ni,Co)O$_2$ (in which x>0, for example x=0.2, such as Li$_{1.2}$Mn$_{0.6}$Ni$_{0.2}$O$_2$).

The compound comprising aluminium may be an aluminium salt and more specifically an in situ formed aluminium salt. Even more specifically, the aluminium salt may be an aluminium salt having aluminium cations, which may originate from partial corrosion of the aluminium current collector associated with the positive electrode. The anions may originate from those of the lithium salt of the electrolyte or a decomposition of the anions of the lithium salt of the electrolyte.

For example, the aluminium salt may be comprise, as anions, anions comprising one or several halogen atoms such as fluorine and/or chlorine and more specifically anions comprising one or several fluorine atoms such as imide anions and even more specifically, (trifluoromethane)sulfonylimide anions, particularly when the lithium salt used is LiTFSI; or a triflate anion, particularly when the lithium salt used is lithium triflate.

A specific cell conforming with the invention is a cell in which:

the positive electrode comprises, as an active material, a lithiated phosphate comprising at least one metallic transition element, such as LiFePO$_4$; and/or the electrolyte is a liquid electrolyte comprising at least one lithium imide salt, such as LiTFSI and one or several carbonate solvents, such as an EC/DMC mixture.

The cells according to the invention may be prepared or regenerated by a process comprising a step consisting of subjecting:

a cell comprising a negative electrode comprising, as active material, metallic lithium; a positive electrode associated with an aluminium current collector; and an electrolyte located between said negative electrode and said positive electrode comprising at least one lithium salt chosen from among lithium imide, lithium triflate, lithium perchlorate salts and mixtures thereof; to a corrosion potential of aluminium for a sufficiently long time to obtain partial corrosion of the aluminium collector and the concomitant formation of a layer comprising a compound comprising aluminium on the face of the negative electrode in contact with the electrolyte.

To fix this corrosion potential and its application duration, prior tests can be carried out with a test cell satisfying the same specific features as those to be subjected to the method, the prior tests consisting of testing different pairs of potentials and duration until the pair is obtained that can produce the layer, production of this layer possibly being followed by EDX spectroscopy. The temperature can also be adjusted, knowing that the temperature criterion can have an influence on the quantity of corroded material and consequently on the quantity of layer deposited.

Advantageously, the corrosion potential is fixed at a value higher then the functioning voltage of the cell, examples of ranges of operating voltages being given for specific active material/lithium salt pairs shown in the table given later.

According to one particular embodiment, the cell subjected to the method does not comprise a layer including a compound containing aluminium, which means that the method is used on a cell that has not yet functioned. As a variant, the cell on which the method is used may comprise a degraded layer containing a compound comprising aluminium, which in the latter case means that the method can be a regeneration method and that it can be used with a cell that has already been used. Indeed, for a cell conforming with the invention that has already been cycled one or several times, a lithium layer may form on the surface of the layer comprising a compound containing aluminium, thus making it expedient to refresh this layer using the above-mentioned method.

For example, when the cell comprises an electrolyte containing a lithium salt LiTFSI and the positive electrode comprises LiFePO$_4$ as active material, the corrosion potential can be fixed at a value equal to 4.5 V vs Li$^+$/Li and held for a duration of the order of 10 hours to obtain the formation of a layer containing aluminium.

Other examples are given in the following table, indicating the potential to be applied for each specific positive electrode lithium salt/active material pair to obtain partial corrosion of the aluminium necessary for the formation of a layer comprising aluminium and the operating voltage range for these pairs.

| Lithium salt | Cathode active material | Corrosion potential (in V vs. Li$^+$/Li | Operating voltage range (in V vs. Li$^+$/Li) |
|---|---|---|---|
| LiTFSI | LiFePO$_4$ | >4 | 2.5-3.7 |
| LiTFSI | TiS$_2$ | >4 | 1.5-3 |
| LiTFSI | FeS$_2$ | >4 | 0.5-2 |
| LiTFSI | V$_2$O$_5$ | >4 | 2-4 |
| LiTFSI | Li$_2$TiS$_3$ | >4 | 1.5-3 |
| LiTFSI | Li$_3$NbS$_4$ | >4 | 1.5-3 |
| LiClO$_4$ | Elementary sulfur S$_8$ | 4.5 | 1.5-3 |
| LiFSI | LiFePO$_4$ | >4.5 | 2.5-3.7 |
| LiFSI | TiS$_2$ | >4.5 | 1.5-3 |
| LiFSI | FeS$_2$ | >4.5 | 0.5-2 |
| LiFSI | V$_2$O$_5$ | >4.5 | 2-4 |
| LiFSI | Li$_2$TiS$_3$ | >4.5 | 1.5-3 |
| LiFSI | Li$_3$NbS$_4$ | >4.5 | 1.5-3 |
| LiFSI | Li(Mn, Ni, Co)O$_2$ | >4.5 | 3-4.3 |
| Lithium triflate | Elementary sulfur S$_8$ | >3 | 1.5-2.5 |
| Lithium triflate | TiS$_2$ | >3 | 1.5-2.5 |
| Lithium triflate | FeS$_2$ | >3 | 0.5-2 |
| Lithium triflate | Li$_2$TiS$_3$ | >3 | 1.5-2.5 |
| Lithium triflate | Li$_3$NbS$_4$ | >3 | 1.5-2.5 |
| LiBETI | LiFePO$_4$ | >4.5 | 2.5-3.7 |
| LiBETI | Elementary sulfur S$_8$ | >4.5 | 1.5-3 |
| LiBETI | TiS$_2$ | >4.5 | 1.5-3 |
| LiBETI | FeS$_2$ | >4.5 | 0.5-2 |
| LiBETI | V$_2$O$_5$ | >4.5 | 2-4 |
| LiBETI | Li$_2$TiS$_3$ | >4.5 | 1.5-3 |
| LiBETI | Li$_3$NbS$_4$ | >4.5 | 1.5-3 |
| LiBETI | LiCoO$_2$ | >4.5 | 3-4.2 |
| LiBETI | Li(Mn, Ni, Co)O$_2$ | >4.5 | 3-4.2 |
| LiBETI | Li(Ni, Co, Al)O$_2$ | >4.5 | 3.5-4.3 |
| LiBETI | LiMnPO$_4$ | >4.5 | 3.5-4.3 |
| LiBETI | LiMn$_2$O$_4$ | >4.5 | 3.5-4.3 |
| LiBETI | Li$_{1+x}$(Mn, Ni, Co)O$_2$ | >4.5 | 3.5-4.4 |

Finally, the invention relates to the use of a layer comprising a compound containing aluminium on a metallic lithium electrode, contained in a cell, in order to improve its cyclability, said cell comprising a positive electrode associated with an aluminium current collector and an electrolyte arranged between the positive electrode and the negative electrode and containing at least one lithium salt chosen from among lithium imide, lithium triflate, lithium perchlorate salts and mixtures thereof, said layer comprising a compound containing aluminium being deposited on the face of the negative electrode in contact with the electrolyte.

The special features of the positive electrode, the electrolyte and the layer already defined for cells as such are also valid for this use.

Other characteristics and advantages of the invention will become clear after reading the following additional description and that applies to particular embodiments.

Obviously, this additional description is only given to illustrate the invention and in no way forms a limitation of it.

DETAILED PRESENTATION OF PARTICULAR EMBODIMENTS

EXAMPLE

This example illustrates an electrochemical cell conforming with the invention and, for comparison, a cell not conforming with the invention (called first cell not conforming with the invention) so as to demonstrate the benefit of the layer comprising a compound containing aluminium on the lithium electrode, on the cyclability properties of this cell.

Figure 1:
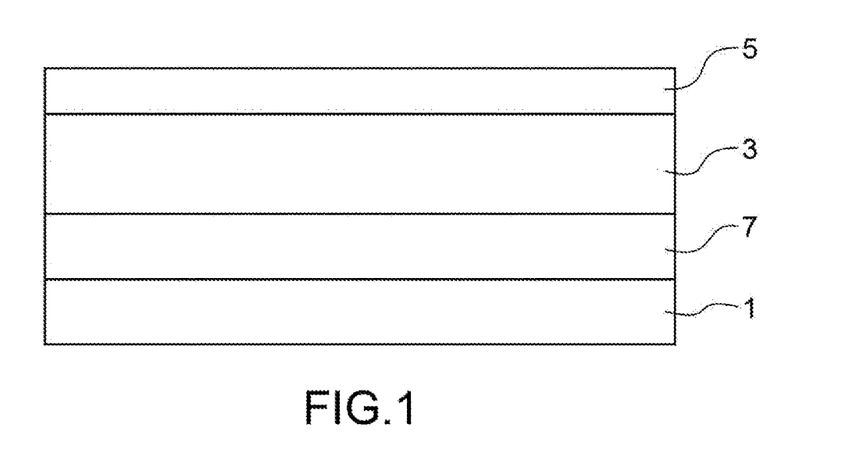
FIG. 1 represents a sectional view of a specific cell according to the invention.

In this example, before the formation cycle, said electrochemical cells are in the form of a button battery comprising a stack of layers as illustrated in appendix FIG. 1 comprising:

a negative electrode 1 composed of metallic lithium in the form of a 16 mm diameter 150 μm thick disk deposited on stainless steel packing (not shown) that acts as a current collector;

a positive electrode 3 comprising, as active material, LiFePO$_4$, as conducting electricity material, carbon black and PVDF as polymeric binder in proportions by mass of 90.5/5/4.5 respectively, said positive electrode being deposited on an aluminium current collector 5 composed of a 20 μm thick disk with a surface area of 154 mm$^2$; and a porous separator 7 composed of a 16.5 mm diameter and 25 μm thick polyolefin disk, said separator being soaked with a liquid electrolyte consisting, for the cell conforming with the invention, of a mixture of carbonate solvents (ethylene carbonate/dimethyl carbonate) and 1M LiTFSI and, for the cell not conforming with the invention, of a mixture of carbonate solvents (ethylene carbonate/dimethyl carbonate) and 1M LiPF$_6$.

Each of these cells is subjected to a formation cycle, particularly with the application of a fixed potential level of 4.5V as common characteristic (vs. Li$^+$/Li) for a duration of 10 hours.

Figure 2:
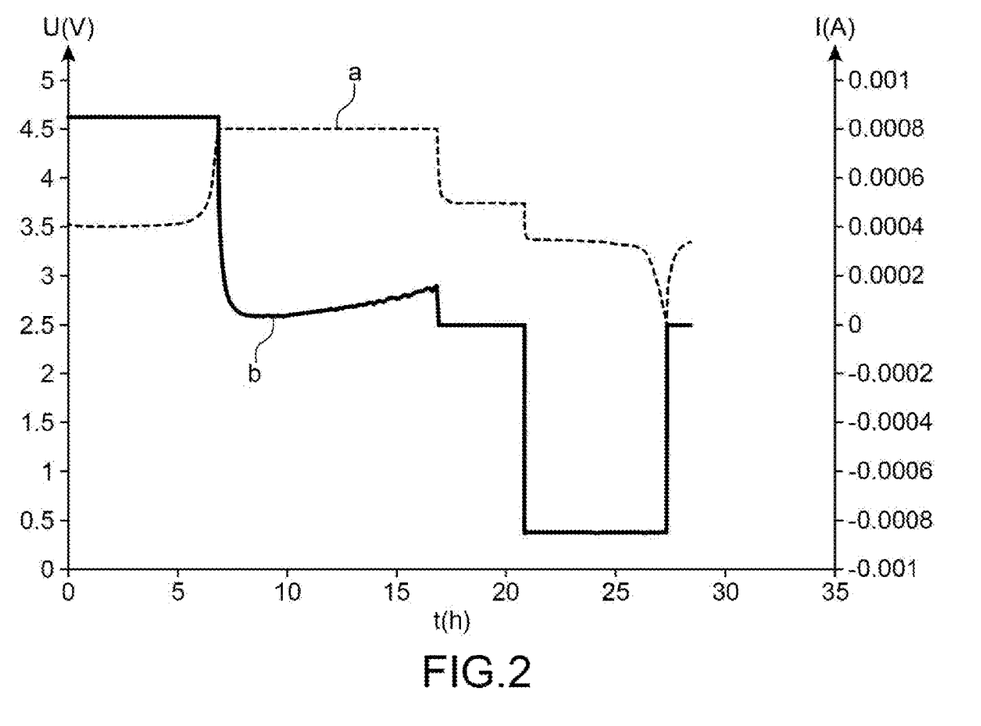
FIG. 2 is a graph illustrating the variation of the potential U (in V) (left ordinate) as a function of time (in h) (curve a) and the simultaneous variation of the current I (in A) (right ordinate) as a function of time (in h) (curve b) for a specific cell conforming with the invention.
Figure 3:
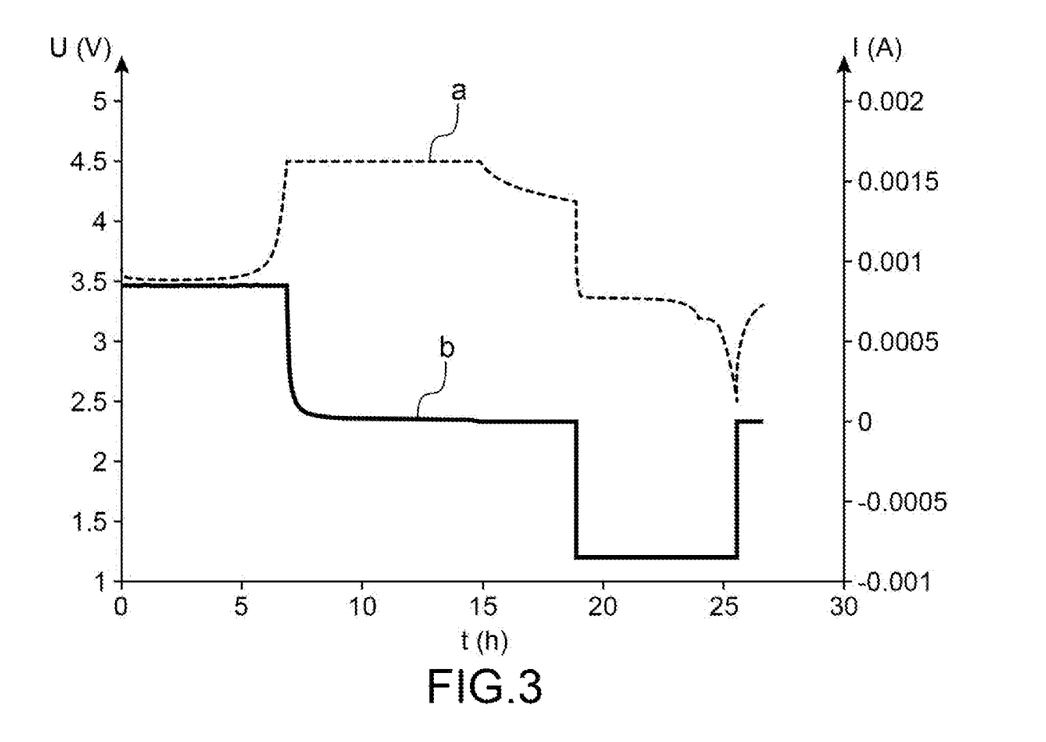
FIG. 3 is a graph illustrating the variation of the potential U (in V) (left ordinate) as a function of time (in h) (curve a) and the simultaneous variation of the current I (in A) (right ordinate) as a function of time (in h) (curve b) for a specific cell not conforming with the invention.

The characteristics of the formation cycle and the current generated during this cycle are shown in FIG. 2 for the cell conforming with the invention, and on FIG. 3 for the cell not conforming with the invention, these figures illustrating firstly the variation of the potential U (in V) (left ordinate) as a function of the duration t (in h) (curves a) on FIG. 2 and FIG. 3) and the simultaneous variation of the current I (in A) (right ordinate) as a function of the duration in t (curves b) on FIG. 2 and FIG. 3).

For the cell conforming with the invention, during the 4.5 V plateau, the first observation was a reduction in the current, followed by an increase representing a corrosion current indicating a partial corrosion phenomenon of the aluminium collector.

More specifically, during the plateau at 4.5V, a capacity of 0.94 mAh is charged. Assuming the Al→Al$^{3+}$+3 e$^-$ corrosion reaction (3×96500 C per mol of corroded aluminium, namely 80.4 Ah/mol), 1.17×10$^{-5}$ mol of aluminium was corroded. This corresponds to 0.3 mg of aluminium, or 0.1 mm³ of Al. The surface area of the collector in the button battery is 154 mm². It is deduced that about 0.7 μm of collector was corroded out of a total of 20 μm, which does not jeopardise its electrical conduction phenomenon.

For the cell not conforming with the invention, during the 4.5 V plateau, the first observation was a reduction in the current, followed by stabilisation of the current, which shows that there is no corrosion, this no corrosion continuing until at least 5 V.

Figure 4:
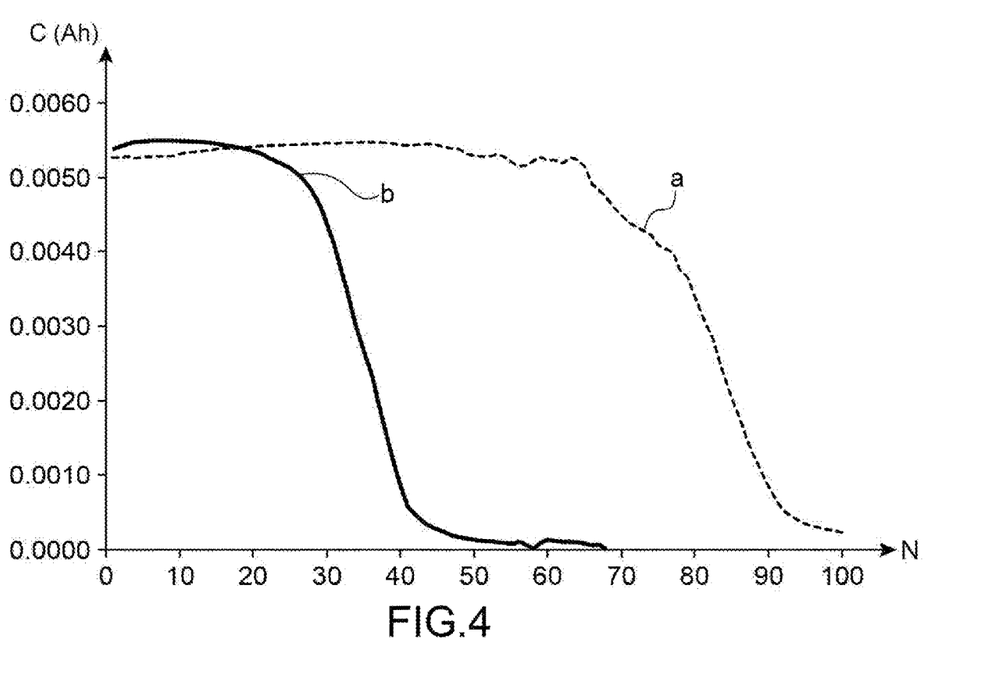
FIG. 4 is a graph illustrating the variation of the discharge capacity C (in Ah) as a function of the number N of cycles, (curve a) for a specific cell conforming with the invention and curve b) for a specific cell not conforming with the invention-.

After this formation cycle, each cell is subjected to galvanostatic cycling in a range of potentials varying from 2.5 to 3.7 V and a current of 0.85 mA, the results being shown on the appended FIG. 4 illustrating the variation of the discharge capacity C (in Ah) as a function of the number of cycles N (curve a) for the cell conforming with the invention and curve b) for the cell not conforming with the invention).

A significant improvement in cyclability of the cell according to the invention is found (with the capacity stabilising at at least 60 cycles) compared with the cell not conforming with the invention using $LiPF_6$ as lithium salt not having been subjected to a partial corrosion phenomenon of the aluminium collector.

The authors of this invention performed this galvanostatic cycling with a second series of cells (one cell conforming with the invention and one cell not conforming with the invention) satisfying the same specific features as mentioned above and having been subjected to a formation cycle identical to that defined above, galvanostatic cycling being stopped in this case at 6 cycles, with the objective of finding an explanation for this phenomenon.

The cells were then opened and the lithium negative electrode was analysed by EDX spectroscopy.

For the cell conforming with the invention, the presence of a layer comprising a compound containing aluminium was found on the lithium electrolyte, the aluminium originating from partial corrosion of the current collector.

There is no such layer on the surface of the lithium electrode of the cell not conforming with the invention, and in particular there is no aluminium on the surface of the lithium electrode.

It is thus deduced that the presence of this layer on the surface of the lithium electrode in contact with the liquid electrolyte containing LiTFSI contributes to improving cyclability of the cell conforming with the invention.

Finally, to clearly demonstrate that the improvement in cyclability is not simply due to the lithium salt used, cells not conforming with the invention (more specifically a second cell not conforming with the invention using as electrolyte, $LiPF_6$ in a mixture of EC/DMC carbonate solvents and a third cell not conforming with the invention using, as electrolyte, LiTSI in a mixture of EC/DMC carbonate solvents, these non-conforming cells being similar in other respects to the first cell not conforming with the invention relating to positive and negative electrodes) were manufactured and cycled between 2.5 and 3.7 V without application of a plateau at 4.5 V (namely a plateau possibly enabling formation of the layer comprising aluminium on the surface of the negative electrode). In both cases, cyclability is similar is similar to cyclability of the first cell not conforming with the invention.

What is claimed is:

1. Electrochemical cell for lithium accumulator comprising:
   a negative electrode consisting of an active material, the active material consisting of metallic lithium;
   a positive electrode associated with an aluminium current collector; and
   a liquid or gel electrolyte placed between said negative electrode and said positive electrode, characterised in that the negative electrode is provided at a face in contact with the electrolyte with a layer comprising a compound containing aluminium, said compound being an aluminium salt, and in that the electrolyte comprises at least one lithium salt chosen from among lithium imide, lithium triflate, lithium perchlorate salts and mixtures thereof.

2. Cell according to claim 1, wherein the positive electrode comprises an active material, the positive electrode active material chosen from among lithiated phosphates comprising at least one metallic transition element, lithiated oxides comprising at least one metallic element, lithium based metal sulfides, vanadium oxides, disulfides based on at least one metallic transition element, elementary sulfur and mixtures thereof.

3. Cell according to claim 2 wherein, when the positive electrode active material is a lithiated phosphate comprising at least one metallic transition element, it corresponds to a lithiated phosphate with formula $LiM^1PO_4$, wherein $M^1$ is chosen from among Fe, Mn, Ni, Co and mixtures thereof.

4. Cell according to claim 2 wherein, when the positive electrode active material is a lithiated oxide comprising at least one metallic transition element, it corresponds to a lithiated oxide comprising nickel, cobalt, manganese and/or aluminium.

5. Cell according to claim 4, wherein the lithiated oxide comprising nickel, cobalt, manganese and/or aluminium satisfies the following formula:

$$Li_{1+x}M^2O_2,$$

wherein $M^2$ is an element chosen from among Ni, Co, Mn, Al and mixtures thereof and x is greater than or equal to 0.

6. Cell according to claim 2 wherein, when the positive electrode active material is a lithium based metal sulfide, it corresponds to a lithium based metal sulfide of the "rocksalt" type.

7. Cell according to claim 2 wherein, when the positive electrode active material is a vanadium oxide, it corresponds to vanadium oxide $V_2O_5$.

8. Cell according to claim 2 wherein, when the positive electrode active material is a disulfide based on at least one metallic transition element, it corresponds to a crystallising disulfide in a pyrite type crystalline system.

9. Cell according to claim 1, wherein the liquid electrolyte comprises one or several organic solvents in the carbonate solvents family and/or the ether solvents family.

10. Cell according to claim 1, wherein the gel electrolyte is a liquid electrolyte impregnating a polymer matrix that gelifies in contact with the liquid electrolyte.

11. Cell according to claim 10, wherein the liquid electrolyte impregnating the polymer matrix is a liquid electrolyte comprising one or several organic solvents in the carbonate solvents family and/or the ether solvents family.

12. Cell according to claim 1 wherein, when the lithium salts are lithium imide salts, they are chosen from among lithium bis(trifluoromethane)sulfonylimide with formula $Li[N(SO_2CF_3)_2]$, lithium bis(fluorosulfonyl)imidide with formula $Li[N(SO_2F)_2]$ and lithium bis(pentafluoroethane) sulfonylimide with formula $Li[N(SO_2CF_2CF_3)_2]$.

13. Cell according to claim 1, wherein:
when the lithium salt is lithium bis(trifluoromethane)sulfonylimide, the positive electrode comprises, as active material, a lithiated phosphate comprising at least one metallic transition element, such as LiFePO$_4$ and/or a disulfide based on at least one metallic transition element, such as TiS$_2$ or FeS$_2$ and/or a vanadium oxide, such as V$_2$O$_5$ and/or a metal sulfide based on lithium of the "rock-salt" type, such as Li$_2$TiS$_3$ or Li$_3$NbS$_4$;

when the lithium salt is lithium perchlorate, the positive electrode comprises, as active material, elementary sulfur;

when the lithium salt is lithium bis(fluorosulfonyl)imide, the positive electrode comprises, as active material, a lithiated phosphate comprising at least one metallic transition element, and/or a disulfide based on at least one metallic transition element, a vanadium oxide, and/or a metal sulfide based on lithium of the "rock-salt" type, and/or a lithiated oxide comprising at least one metal element;

when the lithium salt is lithium triflate, the positive electrode comprises, as active material, elementary sulfur and/or a disulfide based on at least one metallic transition element, and/or a metal sulfide based on lithium of the "rock-salt" type;

when the lithium salt is LiBETI, the positive electrode comprises, as active material, a lithiated phosphate comprising at least one metallic transition element, and/or elementary sulfur and/or a disulfide based on at least one metallic transition element, and/or a vanadium oxide and/or a metal sulfide based on lithium of the "rock-salt" type, and/or a lithiated oxide comprising at least one metallic element or an overlithiated oxide comprising manganese and nickel.

14. Cell according to claim 1, wherein the aluminium salt comprises, as anions, anions comprising one or more several halogen atoms.

15. A method of preparing or regenerating a cell as defined in claim 1, comprising a step consisting of subjecting:
a cell comprising a negative electrode consisting of an active material, the active material consisting of metallic lithium; a positive electrode associated with an aluminium current collector; and an electrolyte located between said negative electrode and said positive electrode comprising at least one lithium salt chosen from among lithium imide, lithium triflate, lithium perchlorate salts and mixtures thereof;
to a corrosion potential of aluminium for a sufficiently long time to obtain partial corrosion of the aluminium collector and the concomitant formation of a layer comprising a compound containing aluminium on the face of the negative electrode in contact with the electrolyte.

16. A method of preparing and electrochemical cell for a lithium accumulator, the method comprising depositing a layer comprising a compound containing an aluminium salt, on a face of a negative electrode, wherein the negative electrode consists of an active material, the active material consisting of metallic lithium
wherein the face of the negative electrode is in contact with a liquid or gel electrolyte chosen from among lithium imide, lithium triflate, lithium perchlorate salts and mixtures thereof:
and wherein the liquid or gel electrolyte is arranged between said face of the negative electrode and a positive electrode associated with an aluminium current collector.

* * * * *